US010368496B2

(12) United States Patent
Chan et al.

(10) Patent No.: US 10,368,496 B2
(45) Date of Patent: *Aug. 6, 2019

(54) SYSTEMS AND METHODS FOR PRUNING PLANTS

(71) Applicant: Elwha LLC, Bellevue, WA (US)

(72) Inventors: Alistair K. Chan, Bainbridge Island, WA (US); Roderick A. Hyde, Redmond, WA (US); Tony S. Pan, Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/233,766

(22) Filed: Aug. 10, 2016

(65) Prior Publication Data

US 2016/0345507 A1    Dec. 1, 2016

Related U.S. Application Data

(63) Continuation of application No. 14/600,500, filed on Jan. 20, 2015, now Pat. No. 9,420,748.

(51) Int. Cl.
| | | |
|---|---|---|
| *A01G 3/08* | (2006.01) | |
| *G05D 1/00* | (2006.01) | |
| *G06K 9/46* | (2006.01) | |
| *B64C 39/02* | (2006.01) | |

(52) U.S. Cl.
CPC ............. *A01G 3/085* (2013.01); *A01G 3/08* (2013.01); *A01G 3/086* (2013.01); *A01G 3/088* (2013.01); *B64C 39/024* (2013.01); *G05D 1/0011* (2013.01); *G05D 1/0094* (2013.01); *G06K 9/4671* (2013.01); *G05D 2201/0201* (2013.01)

(58) Field of Classification Search
CPC .............................. A01G 3/08; G05D 1/0088
See application file for complete search history.

(56) References Cited

U.S. PATENT DOCUMENTS

| | | | | |
|---|---|---|---|---|
| 9,420,748 | B2 * | 8/2016 | Chan | A01G 3/08 |
| 2005/0016425 | A1 * | 1/2005 | Huang | A01C 11/025 |
| | | | | 111/105 |
| 2006/0213167 | A1 * | 9/2006 | Koselka | A01D 46/30 |
| | | | | 56/10.2 A |
| 2007/0003654 | A1 * | 1/2007 | Morimoto | B01F 7/04 |
| | | | | 425/208 |
| 2007/0069056 | A1 * | 3/2007 | Shouse | A01G 3/00 |
| | | | | 241/277 |
| 2010/0205219 | A1 * | 8/2010 | Rousselle | G06Q 10/10 |
| | | | | 707/797 |

(Continued)

OTHER PUBLICATIONS

Arborist Drone, from YouTube (http://www.youtube.com/watch?=RYRIT4171ow), Published on Feb. 4, 2014, 2 pages.

(Continued)

*Primary Examiner* — Hussein Elchanti
(74) *Attorney, Agent, or Firm* — Foley & Lardner LLP (57) ABSTRACT

An unmanned pruning vehicle includes a pruning device configured to prune plant material from a plant. The unmanned pruning vehicle also includes a processing circuit is configured to control operation of the pruning device to prune a plant.

30 Claims, 8 Drawing Sheets

(56) References Cited

U.S. PATENT DOCUMENTS

2014/0000232 A1\* 1/2014 Andros ............... A01G 3/0408
                                                          56/235
2014/0168412 A1   6/2014 Shulman et al.

OTHER PUBLICATIONS

Dana Tims, "French vineyard robot has a vine time in Oregon wine country", Oregonlive, Mar. 31, 2014, 3 pages.
Drones for UVM, from tdworld.com (http://videos.tdworld.com/video/Drones-for-UVM), retrieved on Feb. 24, 2015, 2 pages.
Fiona Harvey, "Robot farmers are the future of agriculture, says government", The Guardian, Jan. 9, 2014, 3 pages.
Julie Day, "How to Trim Large Tree Branches", Todayshomeowner.com, retrieved on Feb. 24, 2015, 3 pages.
Michael Keller, Future Farms Will Be Home To Ground-Crawling Robots and Airborne Drones, txchnologist, Jun. 17 2014, 7 pages.
The 'claw drone' modeled on an eagle that can grab its prey in mid air, from Daily Mail (http://www.dailymail.co.uk/sciencetech/article-2294449/The-claw-drone-modelled-eagle-grab-prey-mid-air.html), retrieved on Feb. 24, 2015, 15 pages.
Unmanned Drone Tree Trimming, from YouTube (http://www.youtube.com/watch?v=FEigumNOXA4), Published on Sep. 12, 2013, 2 pages.

\* cited by examiner

SYSTEMS AND METHODS FOR PRUNING PLANTS

CROSS-REFERENCE TO RELATED PATENT APPLICATIONS

This application is a continuation of U.S. patent application Ser. No. 14/600,500, filed Jan. 20, 2015, which is incorporated herein by reference in its entirety for any and all purposes.

BACKGROUND

Plants, including trees, vines, annual/perennial plants, ornamental plants, agricultural plants, and the like, may be pruned or trimmed for various reasons, including providing room for adjacent plants to grow, enabling adequate sunlight to reach certain parts of the plant or other plants, to remove diseased or damaged portions of a plant, and so on. Plants may be pruned using a manual cutting device (e.g., a scissors type cutting device), a powered cutting device (e.g., chainsaw or similar powered cutting device, etc.), or using other techniques (e.g., chemicals, etc.).

SUMMARY

One embodiment relates to an unmanned pruning vehicle. The unmanned pruning vehicle includes a pruning device configured to prune plant material from a plant, and a processing circuit configured to control operation of the pruning device based on pruning data regarding a growing envelope for the plant.

Another embodiment relates to an unmanned pruning vehicle that includes a pruning device configured to prune plant material from a first plant, and a processing circuit configured to control operation of the pruning device to prune the first plant based on pruning data regarding an impact of the first plant on growth of a second plant.

Another embodiment relates to an unmanned pruning vehicle that includes a pruning device configured to prune a plant, and a processing circuit configured to control operation of the pruning device to selectively prune each of a plurality of branches of the plant based on plant data regarding the plurality of branches of the plant.

Another embodiment relates to a method of pruning plants. The method includes receiving pruning data regarding a plant, wherein the pruning data includes data regarding a growing envelope for the plant. The method also includes controlling an unmanned pruning vehicle, which includes a pruning device to prune plant material from the plant based on the growing envelope for the plant.

Another embodiment relates to a method of pruning plants, including receiving pruning data regarding a first plant, wherein the pruning data includes data regarding an impact of the first plant on growth of a second plant, and controlling an unmanned pruning vehicle to prune plant material from the first plant based on the pruning data regarding the impact of the first plant on the growth of the second plant.

Another embodiment relates to a method of pruning plants, including receiving plant data regarding a plant, wherein the plant data includes data regarding a plurality of branches of the plant, and controlling an unmanned pruning vehicle to selectively prune each of the plurality of branches of the plant based on the plant data.

Another embodiment relates to a system for pruning plants. The system includes a pruning device configured to prune plant material from a plant. The system also includes a processing circuit, including a central processing unit and a memory device, configured to control operation of the pruning device based on pruning data regarding a growing envelope for the plant.

Another embodiment relates to a system for pruning plants. The system includes a pruning device configured to prune plant material from a first plant. The system also includes a processing circuit, including a central processing unit and a memory device, configured to control operation of the pruning device to prune the first plant based on pruning data regarding an impact of the first plant on growth of a second plant.

Another embodiment relates to a system for pruning plants. The system includes a pruning device configured to prune a plant. The system also includes a processing circuit including a central processing unit and a memory device. The processing circuit is configured to control operation of the pruning device to selectively prune each of a plurality of branches of the plant based on plant data regarding the plurality of branches of the plant.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

When describing an apparatus, method, or system regarding a plurality of items, such as a plurality of branches, any references to the items, such as through the terms 'the,' 'each,' 'one of,' and other such terms, are generally not meant to be limiting. Rather, in general, any data regarding, analysis of, methods and steps performed on, or other matters concerning the plurality could potentially apply to any subset of the plurality, including but not limited to one item or every item. Additionally, in general, embodiments of the invention as applied to pruning a plant may also be applied to pruning any of a plurality of branches of a plant.

Referring to the figures generally, various embodiments disclosed herein relate to apparatuses, methods, and systems of pruning plants with unmanned pruning vehicles. In one embodiment, an unmanned pruning vehicle has a pruning device such as a cutting device, and a processing circuit configured to control the pruning device and prune a plant, such as by determining a growth model for the growth of the plant, determining a growth envelope for a predetermined point in time in the future, considering sensor data regarding the plant and an environment surrounding the plant, estimating the space occupied by the plant in the future based on the growth model and the sensor data, comparing the estimated space to the growth envelope, pruning the plant based on this comparison, and applying a treatment including a sealant and a medication to the plant after pruning to aid plant repair and future growth.

In various embodiments, an environment may be defined as any region surrounding plants to be pruned. The environment may be expanded or contracted as desired. The environment need not be uniform, but may have sub-regions that depart from an otherwise uniform profile. In some embodiments, to facilitate navigation and calculation of distances, sizes, shapes, and other spatial elements within the environment, any appropriate coordinate system may be defined relative to the environment, including but not limited to a Cartesian x-y-z coordinate system based on linear distances relative to an origin position, or a cylindrical r-z-θ coordinate system based on radial distances, vertical distances, and angles swept relative to an origin position.

In the environment, a local range may be defined as the region representing the maximum distance the pruning device can reach, given that the unmanned pruning vehicle has a relatively fixed position. Similarly, a global range may be defined as the region within the environment that a pruning device may reach, given that the unmanned pruning vehicle including the pruning device does not have a fixed position.

Figure 1:
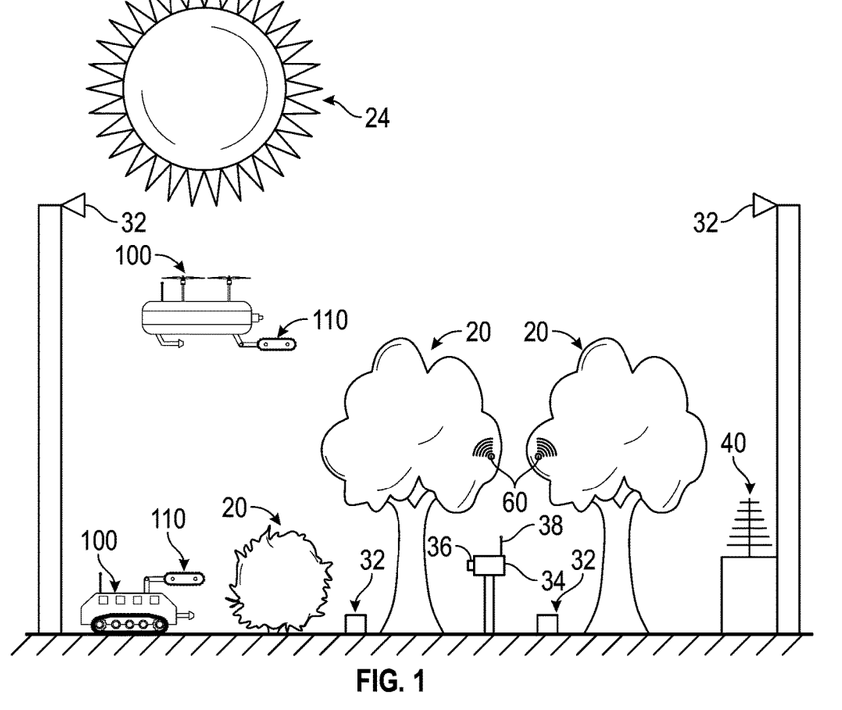
FIG. 1 is a schematic illustration of pruning vehicles and a plurality of plants according to one embodiment.

Referring to FIG. 1, unmanned pruning vehicles 100 may be used to prune plant material from plants 20 of various sizes, shapes, and other features. Plant material includes but is not limited to branches 22, leaves, and flowers. Unmanned pruning vehicle 100 may be an airborne unmanned pruning vehicle, or a land-based unmanned pruning vehicle. In some embodiments, unmanned pruning vehicles 100 may communicate with each other, and/or with central communication hub 40, to determine which plants 20 in a common environment each of unmanned pruning vehicles 100 will prune. In some embodiments, a first, land-based unmanned pruning vehicle may prune all plants 20 within a first global range, while a second, airborne unmanned pruning vehicle may prune all plants 20 within a second global range.

Unmanned pruning vehicles 100 may communicate with sensors 32 that provide information regarding the environment surrounding the plants 20 to be pruned. Sensors 32 may be light sensors sensitive to a particular light source, such as sun 24, or to the intensity of light passing to a particular position in the environment. Sensors 32 may also be temperature sensors that are sensitive to the ambient temperature at a particular position in the environment. Sensors 32 may also be humidity sensors sensitive to the moisture content of a particular position in the environment.

Figure 2A:
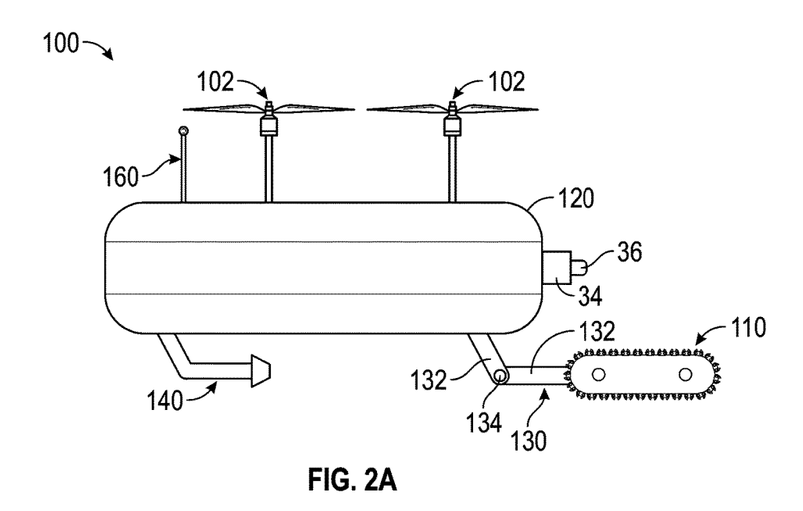
FIGS. 2A and 2B are schematic illustrations of the pruning vehicles of FIG. 1 shown in greater detail according to various embodiments.
Figure 2B:
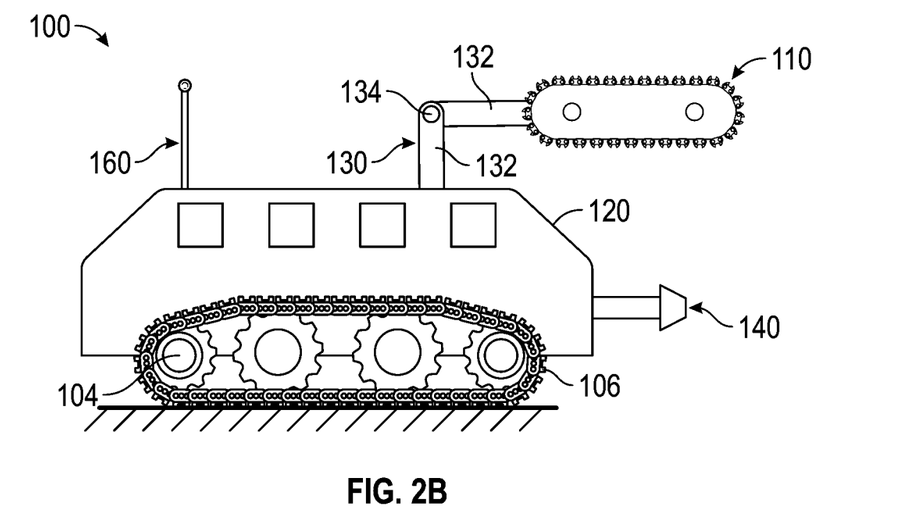
Figure 3:
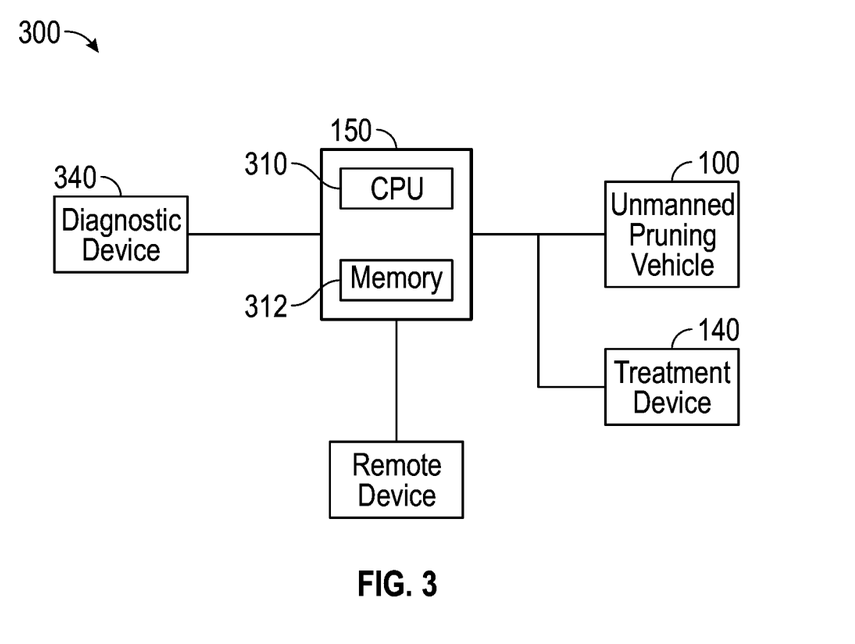
FIG. 3 is a block diagram of a control system for the pruning vehicle of FIG. 1 according to one embodiment.

Referring to FIGS. 2A and 2B, unmanned pruning vehicle 100 may include pruning device 110 and a processing circuit (e.g., processing circuit 150 as shown in FIG. 3) configured to control operation of the pruning device 110. Unmanned pruning vehicle 100 may include chassis 120, and arm 130 between chassis 120 and pruning device 110. Arm 130 may be a single piece, or may include arm sections 132 and joints 134 to allow arm sections 132 to be oriented at different angles relative to each other and to chassis 120. Arm sections 132 may be extendable to increase the local range of unmanned pruning vehicle 100.

In some embodiments, unmanned pruning vehicle 100 includes communication device 160. Communication device 160 may transmit and receive information between the processing circuit and a variety of sources, and may be configured to receive and transmit signals throughout the electromagnetic spectrum, including but not limited to infrared, radio frequency, and microwave signals, and electronic communication protocols such as wireless internet, wired internet, Bluetooth, and near field technologies. In some embodiments, unmanned pruning vehicle 100 includes sensors 32, and communication device 160 may transmit and receive information to and from sensors 32 and the processing circuit.

In some embodiments, unmanned pruning vehicle 100 is an airborne unmanned pruning vehicle, and may include devices for providing airborne propulsion, such as a motor coupled to a plurality of rotors 102; for example, unmanned pruning vehicle 100 may be a quadrotor drone. In some embodiments, unmanned pruning vehicle 100 is a land-based unmanned pruning vehicle, and may include devices for providing land-based propulsion, such as a motor coupled to a plurality of wheels 104, or a plurality of movable limbs. Wheels 104 may be surrounded by continuous track 106 in order to facilitate travel over various terrains. In some embodiments, the motion of unmanned pruning vehicle 100 may be autonomously controlled by an on-board controller. In some embodiments, some or all motion of unmanned pruning vehicle 100 may be remotely controlled, e.g., via a remote processor, or by a remote human controller. In remotely controlled embodiments, unmanned pruning vehicle 100 may wireless transmit vehicle motion data (e.g., from a camera, a radar, accelerometers, gyroscopes, inclinometers, etc.) to a remote controller, and may wireless receive motion control signals from the remote controller.

Referring to FIG. 3, system 300 for pruning plants is shown. System 300 includes processing circuit 150 having central processing unit 310 and memory device 312, unmanned pruning vehicle 100, treatment device 140, diagnostic device 340, and remote device 350. Processing circuit 150 is configured to control operation of unmanned pruning vehicle 100 to prune plant 20. Processing circuit 150 is also configured to control operation of treatment device 140 to provide a treatment to a newly exposed portion of plant 20 after pruning. Treatment may include application of at least one of a medicine and a sealant. In some embodiments, pruned material from the plant may be collected by unmanned pruning vehicle 100 and transported to a remote site for disposal and/or analysis. In some embodiments, system 300 is implemented entirely on vehicle 100. In other embodiments, one or more components of system 300 are implemented remotely from vehicle 100.

Central processing unit 310 may be implemented as a general-purpose processor, an application specific integrated circuit (ASIC), one or more field programmable gate arrays (FPGAs), a digital-signal-processor (DSP), a group of processing components, or other suitable electronic processing components. Memory 312 is one or more devices (e.g., RAM, ROM, Flash Memory, hard disk storage, etc.) for storing data and/or computer code for facilitating the various processes described herein. Memory 312 may be or include non-transient volatile memory or non-volatile memory. Memory 312 may include database components, object code components, script components, or any other type of information structure for supporting the various activities and information structures described herein. Memory 312 may be communicably connected to central processing unit 310 and provide computer code or instructions to central processing unit 310 for executing the processes described herein.

In some embodiments, diagnostic device 340 includes a camera. In some embodiments, diagnostic device 340 includes a sensor, such as a radar, a light sensor, a temperature sensor, or a humidity sensor. In some embodiments, diagnostic device 340 is configured to collect sensor data including at least one of plant sensor data regarding plant 20 and environment data regarding an environment surrounding plant 20, and processing circuit 150 is configured to receive the sensor data and control operation of unmanned pruning vehicle 100 based on the sensor data. In some embodiments, diagnostic device 340 includes at least one of a camera, a radar, a light sensor, a temperature sensor, and a moisture sensor. In some embodiments, unmanned pruning vehicle 100 is configured to document its pruning operations by collecting pre-pruning and post-pruning plant sensor data (e.g., camera images) via diagnostic device 340. Such documentation, and/or other plant data, can be stored and may be reported (e.g., via wireless transmission) to a remote device.

In some embodiments, remote sensor 350 may be located remote from unmanned pruning vehicle 100. In some embodiments, remote sensor 350 is configured to collect remote sensor data including at least one of plant sensor data regarding plant 20 and environment data regarding an environment surrounding plant 20, and processing circuit 150 is configured to receive the remote sensor data and control operation of unmanned pruning vehicle 100 based on the remote sensor data. In some embodiments, remote sensor 350 includes at least one of a camera, a radar, a light sensor, a temperature sensor, and a moisture sensor.

Referring to FIGS. 4A-4E, a pruning device, such as pruning device 110 of an unmanned pruning vehicle 100, includes at least one of cutting device 404, thermal pruning device 408, chemical pruning device 412, and laser pruning device 416.

Figure 4A:
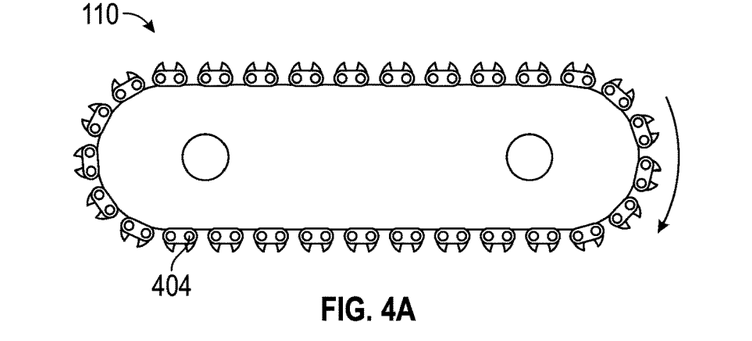
FIGS. 4A-4E illustrate various pruning devices usable in connection with the pruning vehicle of FIG. 1 according to various embodiments.

As show in FIG. 4A, cutting device 404 is a chainsaw. Cutting device 404 may also be a saw, a knife, a circular saw, or any other cutting device; it may be made of plastic, metal, a metal alloy, or any other material.

Figure 4B:
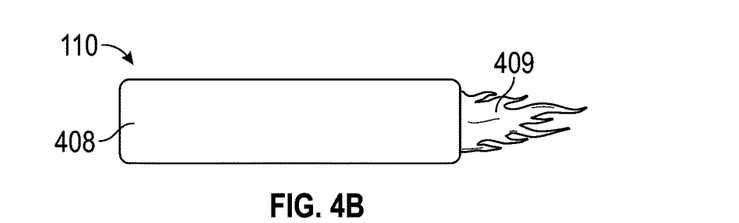

Referring to FIG. 4B, thermal pruning device 408 is a combustion-based heat source, such as flame 409. The combustion fuel may be a solid, a liquid, or a gas. The properties of flame 409, such as its temperature, length, or whether it is laminar or turbulent, may be controlled by, for example, regulating flow rates of an oxidizer and the fuel. Flame 409 may be premixed or may be a diffusion flame. Flame 409 may be continuous or intermittent. The properties of flame 409 may be held constant, or may be modulated or increased or decreased according to a pattern, feedback from pruning device 110, user input, or any other control.

Figure 4C:
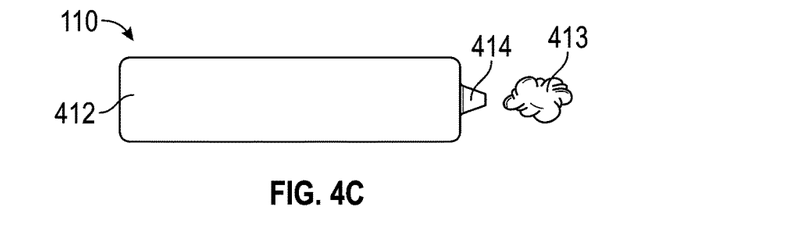
Figure 4D:
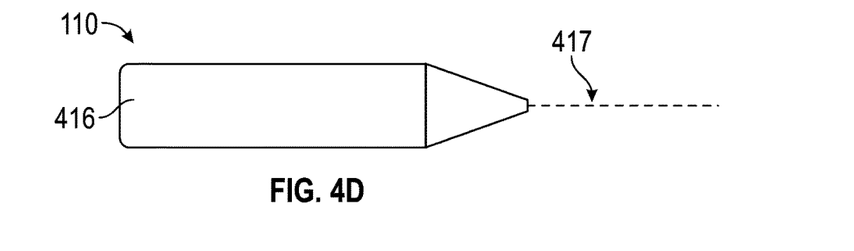
Figure 4E:
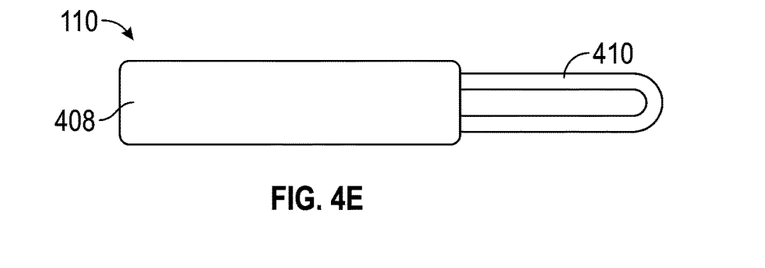

Referring to FIG. 4E, in some embodiments, thermal pruning device 408 includes heated element 410. Heated element 410 may include any material configured to accumulate and deliver local heat, including but not limited to a metal, a metal alloy, or a carbon-based structure. Thermal pruning device 408 may have a solid surface, or may have teeth, serrations, or other structures configured to facilitate pruning; in one example, thermal pruning device 408 includes a heated cutting wire or blade. Heat may be transferred to heated element 410 by a combustion process, or by an electrical resistor, or any other heating process. The temperature of heated element 410 may be modulated, may be held constant, or may be increased and decreased according to a pattern, feedback from pruning device 110, user input, or any other temperature control.

Referring to FIG. 4C, in some embodiments, chemical pruning device 412 applies chemicals 413 to plant 20 in the form of a solid, a liquid, a gas, or a combination thereof. Chemical pruning device 412 may modify the properties of chemicals 413 before applying chemicals 413 to plant 20, such as the temperature or concentration of chemicals 413. Chemical pruning device 412 may include a supply of solvent, such as water or ethanol, to modify the concentration of chemicals 413. Chemical pruning device 412 may include spray nozzle 414 and may apply chemicals 413 to plant 20 as a spray. Chemical pruning device 412 may mix chemicals 413 with a solvent, or with other chemicals 413, before applying chemicals 413 to plant 20. Chemical pruning device 412 may contain multiple chemicals 413 configured to prune multiple plants 20, and processing circuit 150 may be configured to selectively control operation of chemical pruning device 412 to apply chemicals 413 preferentially selected for a specific plant. The flow rate of chemicals 413 leaving chemical pruning device 412 may be modulated in various ways, including but not limited to being held constant, increased and decreased according to a pattern, and being modulated in response to feedback from pruning device 110, user input, or any other chemical control.

Referring to FIG. 4D, in one embodiment, pruning device 110 is or includes laser pruning device 416. In an embodiment, laser 417 includes a solid-state laser, a carbon dioxide laser, or a rare-gas halide laser. Laser 417 may deliver continuous light, or may deliver pulsed light; in an embodiment, laser 417 delivers picosecond or femtosecond pulses. Laser 417 may deliver infrared light, visible light, or ultraviolet light. Laser pruning device 416 may include a motion control system and computer numerical control to direct the direction, intensity, and other properties of laser 417 generated by laser pruning device 416 according to a predetermined pattern, user input, feedback from pruning device 110, or any other control input. In some embodiments, laser pruning device 416 includes multiple lasers 417 directed in multiple directions to facilitate pruning plant 20 from multiple directions.

In some embodiments, processing circuit 150 is configured to control application of a treatment to a newly exposed portion of plant 20 after pruning. The treatment may be a solid, liquid, or gas treatment. Unmanned pruning vehicle 100 may include multiple treatments selected to optimally treat various plants 20 based on the properties of the treatment and of plant 20 to be treated. Unmanned pruning vehicle 100 may mix multiple treatments to provide a composite treatment. Unmanned pruning vehicle 100 may mix treatments with a solvent such as water to alter the concentration or consistency of the treatment to be applied.

In some embodiments, the treatment includes at least one of a sealant (e.g., Spectracide) and a medication (e.g., a fungicide or an insecticide).

Referring to FIGS. 5A-5E, in some embodiments, processing circuit 150 is configured to control operation of pruning device 110 based on pruning data regarding growing envelope 200 for plant 20. Growing envelope 200 may be set in any coordinate system established for the environment. For example, position markers 60 may be placed anywhere in the environment and used as references for positioning growing envelope 200. Alternatively, a user may remotely provide guidance instructions regarding growing envelope 200 to unmanned pruning vehicle 100; e.g., by a wireless transmission to unmanned pruning vehicle 100. Growing envelope 200 need not be uniform; growing envelope 200 may be adapted to specific plants 20 based on characteristics of plants 20; growing envelope 200 may vary with daily, seasonal, annual, or other temporal cycles.

Figure 5A:
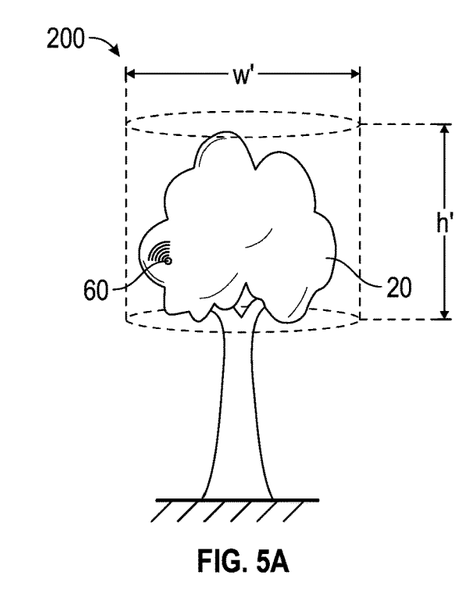
FIGS. 5A-5E illustrate various growing envelopes for plants according to various embodiments.

Referring to FIGS. 5A-5E, growing envelope 200 may include a variety of geometries. In some embodiments, as illustrated in FIG. 5A, growing envelope 200 defines at least one of maximum height h and maximum width w for plant 20.

Figure 5B:
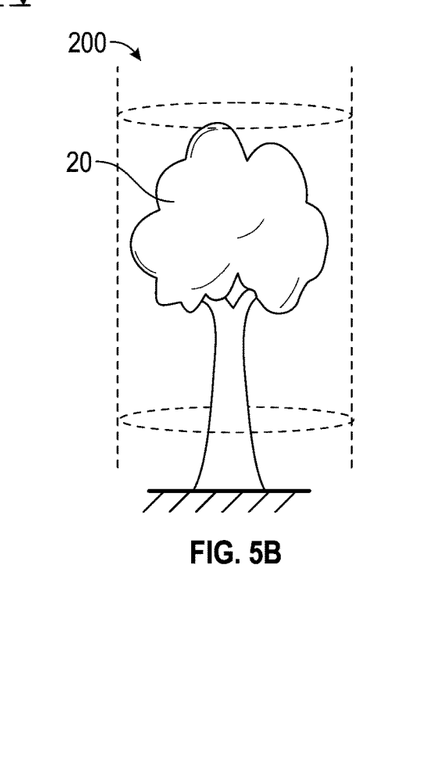

In some embodiments, growing envelope 200 defines a two-dimensional shape. For example, as illustrated in FIG. 5B, growing envelope 200 is characterized by a cylindrical shell which is circular in a horizontal plane and infinite in the vertical direction. In some embodiments, growing envelope 200 is characterized by a shell which is asymmetric in a horizontal plane and infinite in the vertical.

Figure 5C:
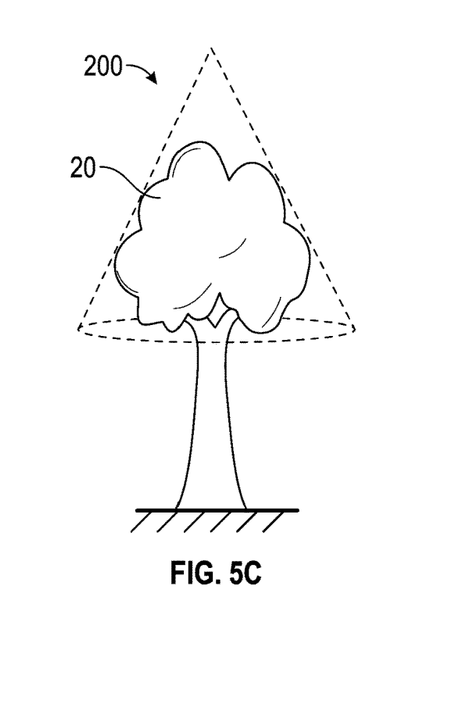

In some embodiments, growing envelope 200 defines a three-dimensional shape. For example, as illustrated in FIG. 5C, growing envelope 200 is characterized by a conical shape, which is circular in any horizontal plane, and tapers to a point in the vertical direction from a first horizontal plane to a second horizontal plane. In some embodiments, growing envelope 200 is characterized by a general three-dimensional shape, without simplifying symmetries.

In some embodiments, growing envelope 200 is determined based on historical data regarding plant 20. The historical data may include specifications regarding the size of plant 20, such as its height, width, depth, shape, or any other relevant geometric measure. The historical data may include specifications for plant 20 as a single whole structure, or for any part of plant 20, such as its branches 22, leaves, or flowers. The historical data may include at least one image of plant 20. Growing envelope 200 may be defined based on the size of plant 20 at a previous point in time, such as the same day during the previous year, or a point in time relevant to solar, lunar, or agricultural calendars. Similarly, growing envelope 200 may be defined based on a size of plant 20 calculated during a specific time period, such as the maximum size, minimum size, median size, mean size, a size offset by a specific value from a size recorded in or calculated from the historical data, or any other size determined from the historical data for the time period.

In some embodiments, growing envelope 200 is based on a growth model for plant 20. The growth model may include various factors including but not limited to instantaneous sunlight intensity, total sun exposure over a relevant time period, temperature, humidity, rainfall, time of year, type of plant, proximity of other plants 20, growth characteristics of other plants 20, desired growth for other plants 20, potential future growth of plant 20, the growth response of plant 20 to how closely it is pruned, and any user input regarding desired growth characteristics. The growth model could demonstrate a linear response, a power law response, an exponential response, a sinusoidal response, or any other relationship to any factor. For example, a growth model could predict that plant 20 will grow in the presence of greater than a minimum value of each factor, but the minimum value for each factor also increases as plant 20 grows, such that plant 20 eventually reaches a steady state size. The growth model could be used to focus pruning at new growth or branch tips. The growth model could also be used to focus pruning at intermediate points along plant 20 or a portion of plant 20, e.g., to thin the density of leaves on one portion of plant 20 in order to allow more light to reach other portions of plant 20.

In some embodiments, processing circuit 150 is configured to control operation of pruning device 110 to prune plant 20 such that plant 20 is estimated to be within growing envelope 200 for plant 20 at a predetermined point in the future.

In some embodiments, processing circuit 150 is configured to receive plant sensor data from sensor 34 regarding plant 20 and control operation of pruning device 110 further based on the plant sensor data. Plant sensor data may include data regarding the size of plant 20, such as its height, width, depth, shape, or any relevant geometric measure. Plant sensor data regarding the size of plant 20 may be based on plant 20 as a single whole structure, or any part of plant 20 such as its branches 22, leaves, or flowers. Plant sensor data may also include data regarding the state of plant 20, such as its temperature, surface conductance, moisture content, density, color, intensity of light striking plant 20, or any other plant data. Plant sensor data may be instantaneous in time, or may be a calculated maximum, minimum, median, or mean value, over a period of time.

The plant sensor data may include image data for plant 20, and processing circuit 150 may be configured to determine whether plant 20 extends beyond growing envelope 200 based on the image data. Image data may be a snapshot of a single instant in time of plant 20, or may include a sequence of images taken at different times. Image data may be a composite image made by overlaying multiple snapshots of plant 20, or a composite image made by time-averaging multiple snapshots of plant 20. Image data may be a real-time image of plant 20.

Figure 5D:
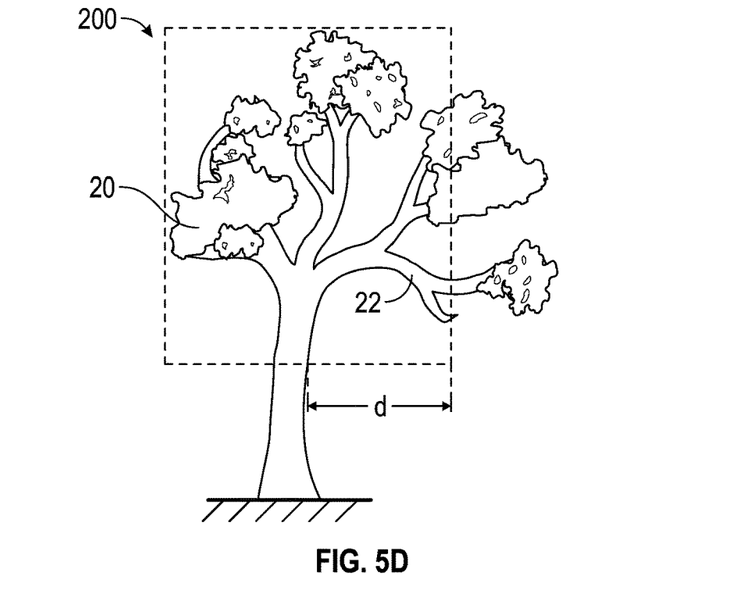

Various techniques may be used to determine whether plant 20 extends beyond growing envelope 200 based on the image data. Plant 20 may be considered to extend beyond growing envelope 200 if any part of plant 20 extends beyond growing envelope 200, or if some minimum volume or mass of plant 20 extends beyond growing envelope 200, or if a part of plant 20 extends beyond growing envelope 200 by some minimum distance. FIG. 5D shows plant 20 including branch 22, along with growing envelope 200 characterized by maximum distance d from plant 20. Plant 20 extends beyond growing envelope 200 because branch 22 extends further from plant 20 than maximum distance d.

Figure 5E:
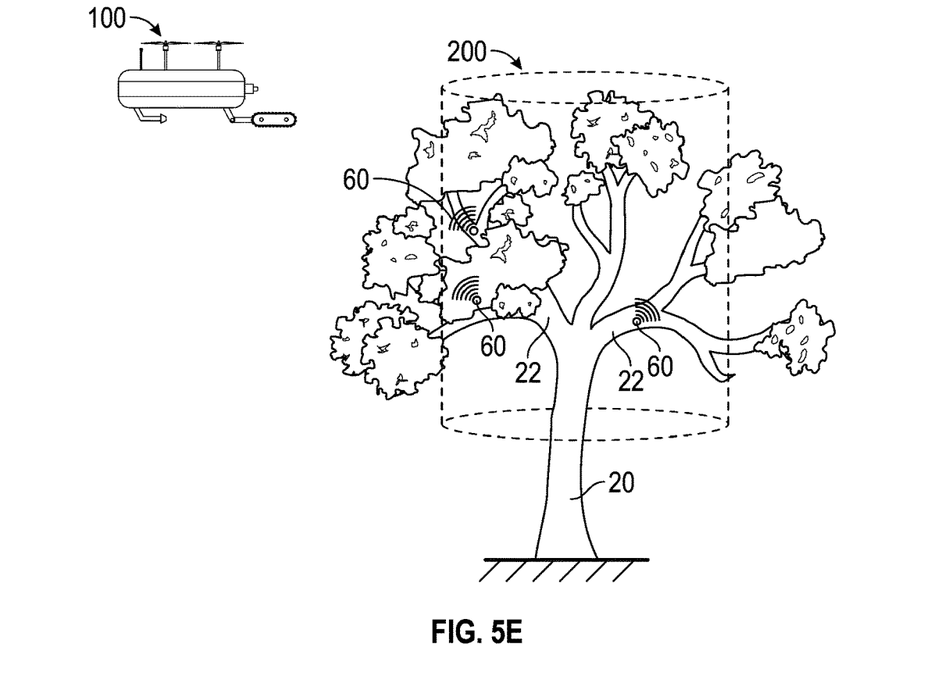

Referring to FIG. 5E, reference position markers 60 may be placed anywhere on plant 20, such as on its outermost branches 22, and compared to the volume swept by the growing envelope 200, to determine whether the reference position markers 60 fall within the volume swept by the growing envelope 200 and thus whether plant 20 extends beyond the growing envelope 200.

In some embodiments, a user looks at image data and compares the image data to growing envelope 200 manually or visually. A user may look at growing envelope 200 superimposed on the image data, and compare plant 20 or part of plant 20 to growing envelope 200 to determine whether plant 20 extends beyond growing envelope 200.

In some embodiments, unmanned pruning vehicle 100 includes sensor 34 regarding plant 20. Sensor 34 may be attached to chassis 120 of unmanned pruning vehicle 100, or may be located within chassis 120 of unmanned pruning vehicle 100. As shown in FIG. 2A, sensor 34 is camera 36 located on chassis 120 of unmanned pruning vehicle 100. Camera 36 may capture still images or videos of plant 20, or may provide a real-time stream of the image of plant 20. Camera 36 may be configured to capture visual information about plant 20 in the visible spectrum, or the infrared spectrum, or any other portion of the electromagnetic spectrum.

As shown in FIG. 1, sensor 34 is located remote from unmanned pruning vehicle 100. Sensor 34 may be placed in a position with optimal visual coverage of plant 20. Sensor 34 may be placed where it has a clear view of multiple plants 20.

In some embodiments, sensor 34 may be connected to sensor communication device 38 (see FIG. 1) that communicates with communication device 160 onboard unmanned pruning vehicle 100. Sensor communication device 38 may also communicate indirectly with communication device 160 onboard unmanned pruning vehicle 100 via a central communication hub, such as central communication hub 36, and may communicate using any communication protocol, including but not limited to the internet, a local intranet or other local communication protocol, radio, and Bluetooth or other short range communication protocols.

In some embodiments, processing circuit 150 is configured to identify plant 20 for pruning based on a pruning schedule. The pruning schedule may be developed based on a variety of factors, including but not limited to: temporal factors such as the time of day, the time of year, the season, the lunar calendar, the solar calendar, or any other temporal factor; spatial factors, such as the size of plant 20 or any part of plant 20, the angle at which plant 20 or any part of plant 20 is aligned or is growing, the distance between plant 20 and the ground or any other plant 20 or structure in the environment, a predetermined pathway traversing the environment to be kept clear, or any other spatial factor; weather and climate factors, such as sunshine, rain, snow, any other form of precipitation, wind, lightning, atmospheric pressure, temperature, humidity, or any other weather or climate factor, or the frequency or expected frequency of any other weather or climate factor. Spatial factors such as a predetermined pathway traversing the environment to be kept clear may be one-dimensional, two-dimensional, or three-dimensional, and may be determined in any spatial coordinate system in the environment.

Figure 6:
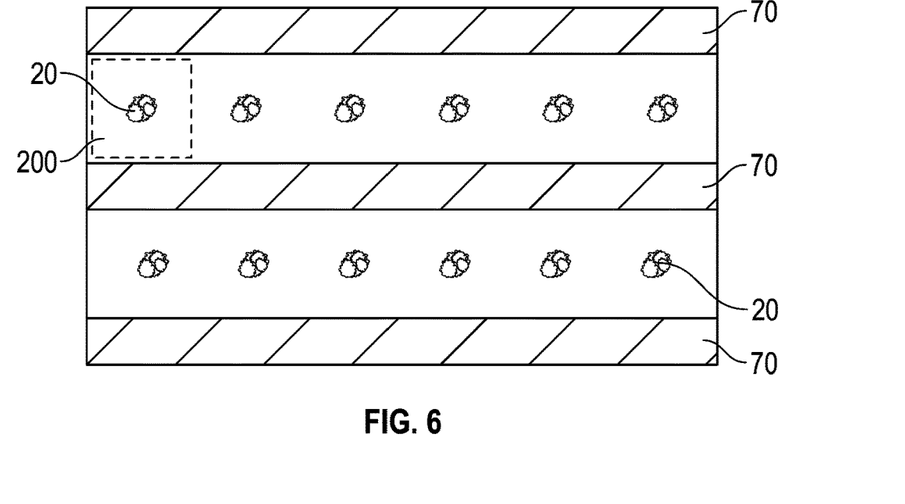
FIG. 6 illustrates a pruning map for a plant area according to one embodiment.

Referring to FIG. 6, pruning map 65 for pruning a plant area of plants 20 is shown. Map 65 may identify predetermined pathways 70 to be kept clear. Map 65 may also include growing envelopes 200 for each plant 20. Processing circuit 150 may be configured to control operation of unmanned pruning vehicle 100 to follow map 65.

In some embodiments, plant 20 is one of an ornamental plant and an agricultural plant. Growing envelope 200, the growth model, the pruning schedule, and any other considerations for pruning plant 20 may be tailored to whether plant 20 is an ornamental plant, or whether plant 20 is an agricultural plant, or whether plant 20 is any other form of a plant.

In some embodiments, growing envelope 200 is defined by object 26 in an environment surrounding plant 20. Object 26 may be another plant 20. Growing envelope 200 may be increased or decreased in size in reference to object 26. Sections of growing envelope 200 may be increased or decreased in size in reference to object 26.

Figure 7:
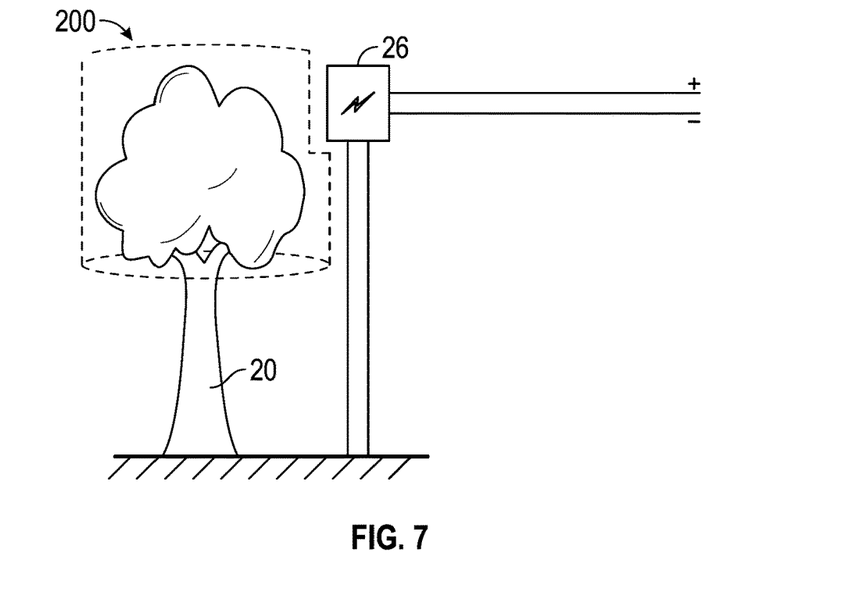
FIG. 7 is a schematic illustration of a growing envelope for a plant according to one embodiment.

Referring to FIG. 7, in some embodiments, growing envelope 200 is defined by object 26 in an environment surrounding plant 20, and object 26 is a power transmission component. The power transmission component may be a power line carrying electricity, a transformer, a generator, or any other power transmission component. In some embodiments, unmanned pruning vehicle 100 may be shielded to minimize interference with electrical and communication systems caused by proximity to a power transmission component. In some embodiments, processing circuit 150 is configured to minimize the proximity of unmanned pruning vehicle 100 to a power transmission component. In some embodiments, growing envelope 200, the growth model, the pruning schedule, and any other consideration for pruning plant 20 may be modified to maintain a target distance or a minimum distance from plant 20 to any power transmission component.

In some embodiments, processing circuit 150 is further configured to control operation of pruning device 110 based on environment data regarding an environment surrounding plant 20. The environment surrounding plant 20 may be characterized by any geometry or coordinate system relevant to plant 20. The environment data may be measured or collected by a sensor in the environment, such as sensor 34 regarding plant 20, or sensor 32 regarding the environment. Multiple sensors may be used to collected multiple data points contemporaneously, which may be compared or combined create a composite impression of the environment surrounding and including plant 20.

The environment data may be received from a source outside the environment, such as user input, a radio weather station, a television weather station, data received via the internet or other online communication sources, or from any other outside source. The environment data may include, but is not limited to: temperature, surface conductance, moisture content, density, color, intensity of light striking plant 20, or any other plant data; atmospheric temperature, dew point, frost point, atmospheric pressure, humidity, or any other data regarding the atmosphere and its moisture content; weather and climate data, such as sunshine, rain, snow, any other form of precipitation, wind, lightning, or any other weather or climate data, or the frequency or expected frequency of any weather or climate event. Environment data may include data concerning a specific instant in time in the past, present, or future, such as a forecast. Environment data may include data concerning a sequence of times at either regular or irregular intervals. In some embodiments, the environment data includes at least one of light data regarding an amount of sunlight reaching the environment, moisture data regarding a moisture content of the environment, and obstacle data regarding an obstacle present in the environment.

Figure 8:
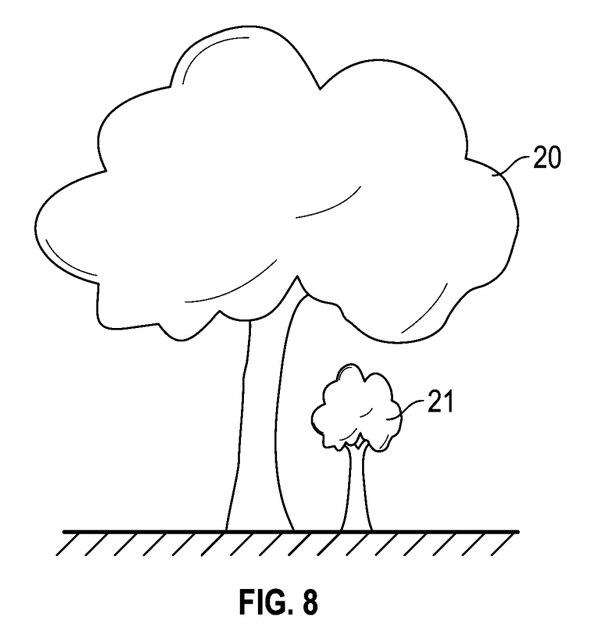
FIG. 8 illustrates a first plant and a second plant according to various embodiments.

Referring to FIG. 8, in some embodiments, unmanned pruning vehicle 100 includes pruning device 110 configured to prune plant material from first plant 20, and processing circuit 150 configured to control operation of pruning device 110 to prune first plant 20 based on pruning data regarding an impact of first plant 20 on the growth of second plant 21. The impact may include physical contact between first plant 20 and second plant 21. Physical contact may include contact between any plant material of first plant 20 and any plant material of second plant 21. For example, physical contact may include pollen or other chemicals or substances released by first plant 20 and contacting second plant 21. The impact may also be non-physical; for example, first plant 20 may block light (i.e., create shade) or rain from reaching second plant 21. Processing circuit 150 may base such anti-shading pruning operations on the anticipated amount of shading; this can be based on factors such as the direction between the plants (e.g., relative to north); on their latitude; on sensor determination of shading; on historical shading data; on simulation of shading by a sunlight transport code; etc. The anticipated shading can be based on current conditions, or on predictions of shading at a later time or over a future time period.

In some embodiments, the pruning data includes historical data for plants 20, 21. The historical data may include specifications regarding the size of plants 20, 21, such as height, width, depth, shape, or any other relevant geometric measure. The historical data may include specifications for plants 20, 21 as a single whole structure, or for any part of plants 20, 21, such as branches 22, leaves, or flowers. The historical data may include at least one image of each plant 20, 21.

In some embodiments, the pruning data includes a growth model of first plant 20, and includes a growth model of second plant 21. A growth model may be any model used to model growth of a plant. The growth model may include various factors including but not limited to instantaneous sunlight intensity, total sun exposure over a relevant time period, temperature, humidity, rainfall, time of year, proximity of other plants, growth characteristics of other plants, desired growth for other plants, potential future growth of plants 20, 21, the growth response of plants 20, 21 to how closely they are pruned, the current sizes of plants 20, 21, and any user input regarding desired growth characteristics. The growth model could demonstrate a linear response, a power law response, an exponential response, a sinusoidal response, or any other relationship to any factor. For example, a growth model could predict that plants 20, 21 will grow in the presence of greater than a minimum value of each factor, but the minimum value for each factor also increases as plants 20, 21 grow, such that plants 20, 21 eventually reach a steady state size.

In some embodiments, processing circuit 150 is configured to receive a first set of plant sensor data from sensor 34 regarding first plant 20, a second set of plant sensor data from sensor 34 regarding second plant 21, and control operation of pruning device 110 further based on the first set of plant sensor data and the second set of plant sensor data. Plant sensor data may include data regarding the sizes of plants 20, 21, such as height, width, depth, shape, or any relevant geometric measure. Plant sensor data regarding the sizes of plants 20, 21 may be based on plants 20, 21 as a single whole structure, or any part of plants 20, 21 such as branches 22, leaves, or flowers. Plant sensor data may also include data regarding the state of plants 20, 21, such as temperature, surface conductance, moisture content, density, color, intensity of light striking the plant, or any other plant data. Plant sensor data may also include image data. Plant sensor data may be instantaneous in time, may represent a time sequence of data, or may be a calculated value such as a calculated maximum, minimum, median, or mean value, over a period of time.

In some embodiments, pruning vehicle 100 may include a sensor 34 configured to acquire data regarding first plant 20 and/or may include sensor 34 configured to acquire data regarding second plant 21. For example, sensor 34 may be attached to chassis 120 of unmanned pruning vehicle 100, or may be located within chassis 120 of unmanned pruning vehicle 100. Sensor 34 may be camera 36 located on chassis 120 of unmanned pruning vehicle 100. Camera 36 may capture still images or videos plants 20, 21, or may provide a real-time stream of the images of plants 20, 21. Camera 36 may be configured to capture visual information about plants 20, 21 in the visible spectrum, or the infrared spectrum, or any other portion of the electromagnetic spectrum.

In some embodiments, sensor 34 is located remote from unmanned pruning vehicle 100. For example, sensor 34 may be placed in a position with optimal visual coverage of plants 20, 21. Sensor 34 could be placed where it has a clear view of multiple plants such as plants 20, 21.

In some embodiments, sensor 34 is connected to a sensor communication device that communicates with communication device 160 onboard unmanned pruning vehicle 100. The sensor communication device may also communicate indirectly with communication device 160 onboard unmanned pruning vehicle 100 via central communication hub 40, or any other communication protocol, including but not limited to the internet, a local intranet or other local communication protocol, radio, and Bluetooth or other short range communication protocols.

Figure 9:
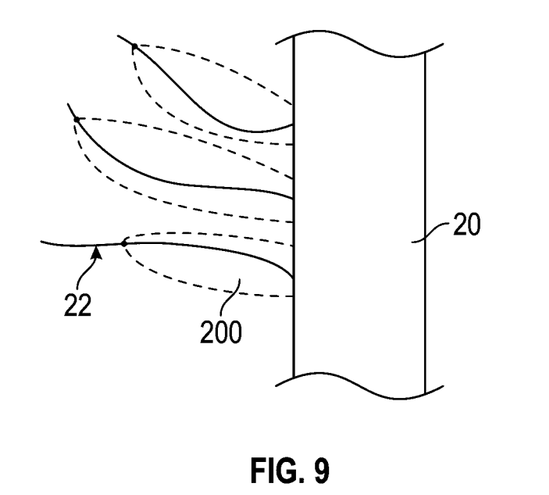
FIG. 9 illustrates a plant having branches and various pruning locations according to one embodiment.

Referring to FIG. 9, in some embodiments, unmanned pruning vehicle 100 includes pruning device 110 configured to prune plant 20, and processing circuit 150 configured to control operation of pruning device 110 to selective prune each of plurality of branches 22 of plant 20 based on plant data regarding plurality of branches 22 of plant 20.

In some embodiments, the plant data may include historical data regarding at least one of plurality of branches 22. The historical data may include specifications regarding the size of branch 22, such as height, width, depth, shape, or any other relevant geometric measure. The historical data may include specifications for branch 22 as a single whole structure, or for any part of branch 22, such as sub-branches, leaves, or flowers. The historical data may include at least one image of at least one of branches 22.

Referring further to FIG. 9, a scheme is shown for selectively pruning plurality of branches 22 of plant 20, based on growing envelope 200 determined for at least one of plurality of branches 22. In some embodiments, growing envelope 200 is based on a growth model for branch 22 or for plant 20 including branch 22. The growth model may include various factors including but not limited to instantaneous sunlight intensity, total sun exposure over a relevant time period, temperature, humidity, rainfall, time of year, proximity of other branches 22 and plants 20, growth characteristics of other branches 22 and plants 20, desired growth for other branches 22 and plants 20, potential future growth of branch 22 or plant 20 including branch 22, the growth response of branch 22 or the growth response of plant 20 including branch 22 to how closely it is pruned, and any user input regarding desired growth characteristics. The growth model could demonstrate a linear response, a power law response, an exponential response, a sinusoidal response, or any other relationship to any factor. For example, a growth model could predict that branch 22 or plant 20 will grow in the presence of greater than a minimum value of each factor, but the minimum value for each factor also increases as branch 22 or plant 20 grows, such that branch 22 or plant 20 eventually reaches a steady state size.

In some embodiments, processing circuit 150 is configured to control operation of pruning device 110 to prune branch 22 such that branch 22 is estimated to be within growing envelope 200 for branch 22 at a predetermined point in the future. Branch reference position markers 60 may be placed anywhere on branch 22, and compared to the volume swept by growing envelope 200, to determine whether branch reference position markers 60 fall within volume swept by growing envelope 200 and thus whether branch 22 extends beyond growing envelope 200.

In some embodiments, processing circuit 150 may be configured to receive branch sensor data from sensor 34 configured to acquire data regarding at least one branch 22 and control operation of pruning device 110 further based on the branch sensor data. Branch sensor data may include data regarding the size of branch 22, such as height, width, depth, shape, or any relevant geometric measure. Branch sensor data regarding the size of branch 22 may be based on branch 22 as a single whole structure, or any part of branch 22 such as sub-branches, leaves, or flowers. Branch sensor data may also include data regarding the state of branch 22, such as temperature, surface conductance, moisture content, density, color, intensity of light striking branch 22, or any other branch data. Branch sensor data may be instantaneous in time, or may be a calculated maximum, minimum, median, or mean value, over a period of time. Branch sensor data may be used to guide pruning based on limiting the length of branches 22. Branch sensor data may be used to limit the load on branch 22. For example, branch 22 may have different loads depending on whether it is bare, has leaves, or has fruit, or whether other branches 22 or portions of plant 20 affect branch 22. A load may be the weight supported by branch 22, or the access that branch 22 has to necessary nutrition. Pruning may be carried out based on a target value for the load (e.g., an amount of fruit) carried by branch 22. The load target can be based on historical data, on a production goal, on a weight carrying capacity of the branch, on a nutrient supply capability of the branch, etc. A growth model for branch 22 may reflect load.

In some embodiments, processing circuit 150 is configured to detect a feedback force occurring when pruning device 110 acts on plant 20, and to direct unmanned pruning vehicle 100 to alter the direction and magnitude of its thrust to at least partially counteract the feedback force. For example, if a feedback force is applied in an upward direction to unmanned pruning vehicle 100 during pruning, processing circuit 150 may be configured to reduce the lift generated by unmanned pruning vehicle 100, so that unmanned pruning vehicle 100 maintains its position. In some embodiments, unmanned pruning vehicle 100 has a suspension configured to dampen the effects of a feedback force occurring while plant 20 is pruned. In some embodiments, unmanned pruning vehicle 100 is configured (e.g., using a second appendage) to attach to the plant during the pruning operation, using the attachment to transfer at least one of a force and a torque between the plant and the pruning vehicle. For instance, unmanned pruning vehicle 100 may use the attachment to steady a branch which it is pruning, or to move an obscuring branch out of the way of a branch which it is pruning. For example, an airborne unmanned pruning vehicle may use the attachment to steady itself or support itself on the plant while performing a pruning operation.

Figure 10:
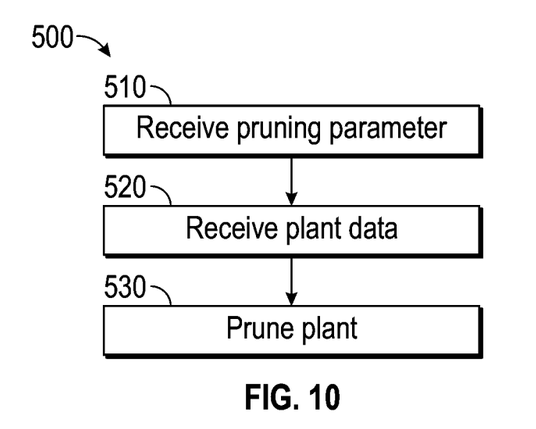
FIG. 10 is a block diagram of a method of pruning plants according to one embodiment.

Referring to FIG. 10, a method 500 is shown for pruning plants. At step 510, pruning data is received. Pruning data may include, but is not limited to, a growing envelope for plant 20, a growth model for plant 20, specifications for the size or shape of plant 20 at a future point in time, or any other such data. At step 520, plant data is received. Plant data may include, but is not limited to, historical data regarding plant 20, image data regarding plant 20, data regarding specific portions of plant 20, data received from sensors 34 regarding plant 20, or any other such data. At step 530, a plant is pruned. Upon receiving pruning data and plant data, the plant pruning step may be performed by directing unmanned pruning vehicle 100 to prune plant 20 in such a way as to ensure that pruning parameters based on the pruning data are satisfied. For example, pruning data may include growing envelope 200 showing the maximum space plant 20 should occupy, plant data may include the space currently occupied by plant 20, and unmanned pruning vehicle 100 may prune plant 20, including specific portions of plant 20 such as branches 22, so that it no longer occupies any space outside of growing envelope 200.

Figure 11:
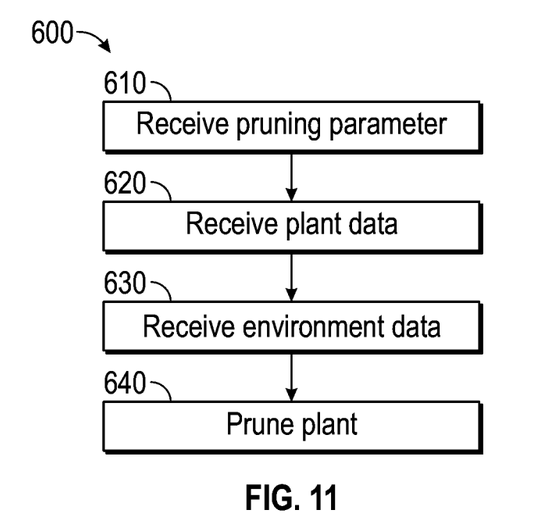
FIG. 11 is a block diagram of a method of pruning plants according to another embodiment.

Referring to FIG. 11, a method 600 is shown for pruning plants. At step 610, pruning data is received. Pruning data may include, but is not limited to, growing envelope 200 for plant 20, a growth model for plant 20, specifications for the size or shape of plant 20 at a future point in time, or any other such data. At step 620, plant data is received. Plant data may include, but is not limited to, historical data regarding plant 20, image data regarding plant 20, data regarding specific portions of plant 20, data received from sensors 34 regarding plant 20, or any other such data. At step 630, environment data is received. Environment data may include, but is not limited to, data regarding temporal factors such as the time of day, the time of year, the season, the lunar calendar, the solar calendar, or any other temporal factor; weather and climate factors, such as sunshine, rain, snow, any other form of precipitation, wind, lightning, atmospheric pressure, temperature, humidity, or any other weather or climate factor, or the frequency or expected frequency of any other weather or climate factor; data regarding the presence of objects in the environment, including other plants 20; or any other environment data. At step 640, a plant is pruned. Upon receiving pruning data, plant data, and environment data, plant pruning step 640 may be performed by directing unmanned pruning vehicle 100 to prune plant 20 in such a way as to ensure that pruning parameters based on the pruning data are satisfied. For example, unmanned pruning vehicle 100 may prune plant 20 so as to ensure that some portions of plant 20 do not block sunlight another portion of plant 20 or to an adjacent plant, such as second plant 21.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An unmanned pruning vehicle, comprising:
    a pruning device configured to prune plant material from a plant; and
    a processing circuit configured to control operation of the pruning device based on pruning data regarding a growing envelope for the plant, the growing envelope based on a growth model for the plant, wherein the plant is identified for pruning based on a portion of the plant material extending beyond the growing envelope, the processing circuit configured to control operation of the pruning device to prune the plant such that the plant is estimated at a predetermined point in time in the future to have a size such that the plant does not extend outside of the growing envelope.

2. The pruning vehicle of claim 1, wherein the growing envelope defines at least one of a maximum height and a maximum width for the plant.

3. The pruning vehicle of claim 1, wherein the growing envelope is determined based on historical data regarding the plant.

4. The pruning vehicle of claim 1, wherein the processing circuit is configured to receive plant sensor data from a sensor and control operation of the pruning device further based on the plant sensor data.

5. The pruning vehicle of claim 4, wherein the plant sensor data includes image data for the plant, and wherein the processing circuit is configured to determine whether the plant extends beyond the growing envelope based on the image data.

6. The pruning vehicle of claim 1, wherein the growing envelope is defined by an object in an environment surrounding the plant.

7. The pruning vehicle of claim 6, wherein the object is a power transmission component.

8. The pruning vehicle of claim 1, wherein the processing circuit is further configured to control application of a treatment to a newly exposed portion of the plant after pruning.

9. The pruning vehicle of claim 1, wherein the processing circuit is configured to receive plant sensor data from a sensor, the plant sensor data comprising at least one of pre-pruning data and post-pruning data.

10. The pruning vehicle of claim 9, wherein the plant sensor data comprises an image.

11. The pruning vehicle of claim 9, wherein the processing circuit is configured to wirelessly transmit information associated with the plant sensor data to a remote device.

12. The pruning vehicle of claim 1, wherein the processing circuit is configured to wirelessly receive one or more pruning instructions from a remote device.

13. A system for pruning plants, comprising:
    an unmanned pruning vehicle configured to prune plant material from a plant; and
    a processing circuit configured to control operation of the unmanned pruning vehicle based on pruning data regarding a growing envelope for the plant, the growing envelope based on a growth model for the plant, wherein the plant is identified for pruning based on a portion of the plant material extending beyond the growing envelope, the processing circuit configured to control operation of the unmanned pruning vehicle to prune the plant such that the plant is estimated at a predetermined point in time in the future to have a size such that the plant does not extend outside of the growing envelope.

14. The system of claim 13, wherein the processing circuit is configured to receive plant sensor data regarding the plant from a sensor and control operation of the unmanned pruning vehicle based on the plant sensor data.

15. The system of claim 13, further comprising a diagnostic device.

16. The system of claim 15, wherein:
    the diagnostic device is configured to collect sensor data including at least one of plant sensor data regarding the plant and environment data regarding an environment surrounding the plant; and
    the processing circuit is configured to receive the sensor data and control operation of the unmanned pruning vehicle based on the sensor data.

17. The system of claim 13, further comprising a remote sensor device located remote from the unmanned pruning vehicle.

18. The system of claim 17, wherein:
    the remote sensor device is configured to collect remote sensor data including at least one of plant sensor data regarding the plant and environment data regarding an environment surrounding the plant; and
    the processing circuit is configured to receive the remote sensor data and control operation of the unmanned pruning vehicle based on the remote sensor data.

19. The system of claim 13, wherein the processing circuit is configured to identify the plant for pruning based on a pruning schedule.

20. The system of claim 13, wherein the processing circuit is further configured to control operation of the unmanned pruning vehicle based on environment data regarding an environment surrounding the plant.

21. The system of claim 20, wherein the environment data includes at least one of light data regarding an amount of sunlight reaching the environment, moisture data regarding a moisture content of the environment, and obstacle data regarding an obstacle present in the environment.

22. The system of claim 13, wherein the processing circuit is further configured to control operation of the unmanned pruning vehicle to form an attachment with the plant while pruning the plant material.

23. A system for pruning plants, comprising:
    an unmanned pruning vehicle configured to prune a plant; and
    a processing circuit configured to control operation of the unmanned pruning vehicle to selectively prune each of a plurality of branches of the plant based on plant data regarding the plurality of branches of the plant, the plant data including a growing envelope for at least one branch of the plurality of branches, wherein controlling operation of the unmanned pruning vehicle includes pruning the at least one branch such that the at least one branch is estimated at a predetermined point in time in the future to have a size such that the at least one branch does not extend outside of the growing envelope.

24. The system of claim 23, wherein the plant data includes historical data regarding at least one branch of the plurality of branches.

25. The system of claim 24, wherein the historical data includes an amount of fruit carried by the at least one branch.

26. The system of claim 23, further comprising a remote sensor device located remote from the pruning vehicle, wherein:
the remote sensor device is configured to collect remote sensor data including at least one of branch sensor data regarding at least one branch of the plurality of branches and environment data regarding an environment surrounding at least one branch of the plurality of branches; and
the processing circuit is configured to receive the remote sensor data and control operation of the unmanned pruning vehicle based on the remote sensor data.

27. The system of claim 23, wherein the processing circuit is further configured to control operation of the unmanned pruning vehicle based on environment data regarding an environment surrounding at least one branch of the plurality of branches, wherein the environment data includes at least one of light data regarding an amount of sunlight reaching the environment, moisture data regarding a moisture content of the environment, and obstacle data regarding an obstacle present in the environment.

28. The system of claim 23, wherein the processing circuit is further configured to control pruning of at least one branch based on a determination of blockage by a first branch of sunlight from reaching a second branch.

29. The system of claim 23, further comprising a diagnostic device, wherein:
the diagnostic device is configured to collect sensor data including at least one of branch sensor data from a sensor regarding the plurality of branches, branch environment data regarding an environment surrounding the plurality of branches, plant sensor data regarding a second plant, and a second environment data regarding an environment surrounding the second plant; and
the processing circuit is configured to receive the sensor data and control operation of the unmanned pruning vehicle further based on the sensor data.

30. The system of claim 23, further comprising a remote sensor device located remote from the unmanned pruning vehicle, wherein:
the remote sensor device is configured to collect remote sensor data including at least one of branch sensor data regarding the plurality of branches, branch environment data regarding an environment surrounding the plurality of branches, plant sensor data regarding a second plant, and a second environment data regarding an environment surrounding the second plant; and the processing circuit is configured to receive the remote sensor data and control operation of the unmanned pruning vehicle based on the remote sensor data.

* * * * *